United States Patent [19]
Parvez et al.

[11] Patent Number: 6,089,507
[45] Date of Patent: Jul. 18, 2000

[54] AUTONOMOUS ORBIT CONTROL WITH POSITION AND VELOCITY FEEDBACK USING MODERN CONTROL THEORY

[76] Inventors: Shabbir Ahmed Parvez, 2702 Copper Creek Rd., Herndon, Va. 20171; Guang-Qian Xing, 8515 Pelham Rd., Bethesda, Md. 20817

[21] Appl. No.: 09/319,161

[22] PCT Filed: Dec. 4, 1997

[86] PCT No.: PCT/US97/22612

§ 371 Date: Jun. 2, 1999

§ 102(e) Date: Jun. 2, 1999

[87] PCT Pub. No.: WO98/25156

PCT Pub. Date: Jun. 11, 1998

Related U.S. Application Data

[60] Provisional application No. 60/032,613, Dec. 5, 1996.

[51] Int. Cl.[7] .................................................. B64G 1/24
[52] U.S. Cl. ...................... 244/158 R; 244/164; 244/176
[58] Field of Search ............................... 244/158 R, 164, 244/176; 701/13

[56] References Cited

U.S. PATENT DOCUMENTS

| | | |
|---|---|---|
| 4,667,203 | 5/1987 | Counselman, III . |
| 5,109,346 | 4/1992 | Wertz . |
| 5,267,167 | 11/1993 | Glickman . |
| 5,374,011 | 12/1994 | Lazarus et al. . |
| 5,528,502 | 6/1996 | Wertz . |

FOREIGN PATENT DOCUMENTS

| 4243395 | 6/1993 | Germany . |
|---|---|---|

OTHER PUBLICATIONS

Maute, P. et al., "Autonomous Geostationary Stationkeeping System Optimization and Validation", Acta Astronautica, vol. 20, pp. 93–101 (1989).

Eckstein, M.C. and Leibold, A., "Autonomous Station Keeping of Geostationary Satellites" Spacecraft Pointing and Control, Agard–AG–260, pp. 7/1–28 (Nov. 1981).

Eckstein, M.C., Leibold, A., and Hechler, F., "Optimal Autonomous Stationkeeping of Geostationary Satellites", American Astronautical Society and AIAA Astrodymanics Specialist Conference, Lake Tahoe, NV, AAS Paper No. 81–206 (Aug. 3–5, 1981).

Martinez, Juan J., "Optimal Orbit Control For Station Keeping With The Multisatellite Support System (MSSS)", Proc. AOCS Conference, Noordwijk, ESA–SP–128 (1977).

(List continued on next page.)

*Primary Examiner*—Galen L. Barefoot
*Attorney, Agent, or Firm*—Roylance, Abrams, Berdo & Goodman, L.L.P.

[57] ABSTRACT

An apparatus and method for orbit control and maintenance techniques for both individual satellites and for multiple satellites in a constellation utilizing Modern Feedback Control for providing precise autonomous on-board navigation and control. This control system can place any satellite in any orbit position in a constellation, including the acquisition of the initial distribution for the constellation after satellite separation from launched vehicles. This system can also maintain distribution within a constellation, including station relocation and station keeping. Utilizing GPS position information, the orbit state vector is determined and modem advanced multivariable feedback control techniques, for example, linear quadratic Gaussian/loop transfer recovery controllers or optimal H-Infinity Robust Controllers are used to design a navigation and control system. The present invention uses a feedback control system designed to attenuate the external perturbations and provide robustness against unstructured uncertainty. The control problem is converted into first a tracking problem and a regulator design problem where the control problem is to minimize both position error and velocity error between the satellite (pursuer) and a nonexistent target satellite in an ideal orbit. The elimination of position error and velocity error result in an optimal orbital control system.

31 Claims, 7 Drawing Sheets

OTHER PUBLICATIONS

Hubert, S. and Swale, J., "Stationkeeping of a Constellation of Geostationary Communications Satellites", AIAA/AAS Astrodynamics Conference, Seattle, WA, AIAA–84–2042 (Aug. 20–22, 1984).

Potti, J., Mora, E.J., and Pasetti, A., "An Autonomous Stationkeeping Geostationary Telecommunications Satellites (An Artemis Based ASK System")), IAF $44^{th}$ International Congress, IAF paper No. 93–041, Graz, Austria (Oct. 16–22, 1993).

Lowrie, L.J., "Autonomous Navigation Systems Technology Assessment", $17^{th}$ Aerospace Sciences Meeting, New Orleans, LA, AIAA No. 79–0056 (Jan. 15–17, 1979).

Boltz, F.W., "Autonomous Orbital Navigation Using Kepler's Equation", AIAA Mechanics amd Control of Flight Conference, Anaheim, CA, AIAA No. 74–808 (Aug. 5–9, 1974).

Markley, F.L., "Autonomous Satellite Navigation Using Landmarks", Advances in the Astronautical Sciences, vol. 46, Part II, Astrodynamics, pp. 898–1010 (1981).

Collins, J.T., Dawson, S., and Wertz, J.R., "Autonomous Constellation Maintenance System", $10^{th}$ Annual AIAA/USU Conference on Small Satellites (Sep. 1996).

Isaac Kaminer et al., "Control of an Underwater Vehicle Using Hoo Synthesis", Proceedings of the $30^{th}$ Conference on Decision and Control, Brighton, England, pp. 2350–2355, Dec. 1991.

B.A.C. Ambrosius, et al., "Application of the Global Positioning System for Hermes Rendezvous Navigation", Journal of Guidance, Control and Dynamics, vol. 16, No. 1, pp. 197–205, Jan.–Feb. 1993.

T. Lahdhiri et al., "LQG–LTR Pitch Attitude Control of an Earth–Orbiting Spacecraft", Proceedings of the $32^{nd}$ Conference on Decision and Control, pp. 445–446, San Antonio, Texas Dec. 12, 1993.

W. Kang, "Control of Spacecraft via Nonlinear Hoo Method", Proceedings of the $33^{rd}$ Conference on Decision and Control, pp. 921–925, Lake Buena Vista, FL Dec. 14, 1994.

T. Holzhü ter, "LQG Approach for the High–Precision Track Control of Ships", IEE Proceedings—Control Theory Appl., vol. 144, No. 2, pp. 121–127, Mar. 1997.

AUTONOMOUS ORBIT CONTROL WITH POSITION AND VELOCITY FEEDBACK USING MODERN CONTROL THEORY

This application claims the benefit of U.S. Provisional Application No. 60/032,613, filed December 5, 1996.

BACKGROUND OF THE INVENTION

1. Field of Invention

This invention relates generally to advanced orbit control and maintenance techniques for both individual satellites as well as for multiple satellites in a constellation, in which Modern Feedback Control is used for providing precise autonomous on-board navigation and control. The basic functions of this control system can place any satellite in any orbit position in a constellation, including the acquisition of the initial distribution for the constellation after satellite separation from launch vehicles, and can also maintain the constellation distribution, including station relocation and station keeping.

2. Description of Related Art

The orbital control of satellites, in both geostationary (GEO) and low-earth orbits (LEO), has primarily been ground-based. Orbit maintenance and station keeping have historically required involvement of Control Center personnel in all phases of operation. The computational burden for satellite control, including orbit analysis, maintenance and stationkeeping, has been on the ground computers. The ground computers provide both the off-line functions of orbit determination and maneuver planning as well as the on-line functions of commanding and telemetry processing.

Current geostationary satellite operations have evolved by taking advantage of the stationary nature of the satellite position relative to the ground stations. For example, the geostationary geometry provides a continuous window for ranging, tracking, and commanding, thereby minimizing the computational burden on the processors on-board the satellites. Low-earth orbit satellites have generally been equipped with more on-board processing capability than geostationary satellites to provide increased autonomy in navigation, command and control. This is because LEO satellites have intermittent ground station contacts of relatively short duration, resulting in limited ability to send commands to the satellites in real time.

The standard design for orbit control is based on the analysis of orbital mechanics, which provides the relationship among the orbital elements, orbit velocity changes and orbital behavior under the perturbing forces. Based on these relationships, orbit control is classified into individual control systems, for example, "orbit control", "orbit eccentricity control", "east-west position control", "drift or velocity drift control" and "orbit inclination control." These individual control laws reflect only partial relationships between individual orbit elements and control actions. However, while two-body orbit initial problem theory provides an analytical relationship between the six orbital elements, for example the semimajor axis (a), the eccentricity (e), the inclination (i), the right ascension of ascending node ($\Omega$), the argument of perigee ($\omega$), and the mean anomaly (M), and the initial state vector, this relationship is non-linearly coupled. When this coupling is neglected, the accuracy of any control system based on these individual models will be limited, and the efficiency of the control system will be low.

Various methods have been studied for control of satellite navigation.

U.S. Pat. No. 5,109,346 to Wertz discloses autonomous navigation control using Global Positioning Satellites (GPS) for orbit determination, and a method for providing orbital corrections. Because Wertz uses a non-feedback control system, this system is subject to unstructured uncertainty. Additionally, Wertz is limited to orbit and attitude determination. Furthermore, position finding using GPS is known, as described for example, in U.S. Pat. No. 4,667,203 to Counselman, III.

Historically, control systems were designed as proportional-integral-derivative (PID) compensators using a variety of frequency response techniques. However, the PID design requires trade-offs with conflicting design objectives such as the gain margin and closed-loop bandwidth until an acceptable controller is found. When the dynamics are complex and poorly modeled, or when the performance specifications are particularly stringent, more powerful control tools are necessary.

These more powerful design tools result in a higher level of satisfaction only if a solution exists to the problem being solved. Achieving both satisfactory performance limits and ascertaining the existence of a satisfactory controller involves using an optimization theory. Use of an optimization theory eliminates the need to search for solutions to problems for which there are no solutions. A further benefit of optimization is that it provides an absolute scale of merit against which any design can be measured. These more powerful design tools utilize modern advanced multivariable feedback control techniques.

It is an object of the present invention to utilize modern advanced multivariable feedback control techniques in the design of a navigation and control system.

SUMMARY OF THE INVENTION

This invention provides a navigation and control system on-board a body in motion, the system having a closed loop multivariable controller, a receiver that receives positioning data, and a converter that converts a control problem into a state-space form. The converter converts the control problem into a tracking problem and a regulator problem in order to minimize the position error and velocity error between the body in motion and a target body. The receiver receives positioning data which may come in the form of range data or signal from another body in motion, for example, a Global Positioning Satellite. The controller is a modem feedback closed loop controller.

This invention provides a navigation and control system that uses the orbit state vector to describe the control system, and modem advanced multivariable feedback control techniques, for example, linear quadratic Gaussian/loop transfer recovery (LQG/LTR) controller or optimal H-Infinity robust controller. This controller enhances the control system performance by minimizing the control error and control effort. Additionally, the real time feedback control results in optimum implementation of an on-board autonomous control system.

The design of the orbit control law mainly depends on the orbit of the two-body problem, with the various external perturbations (e.g. non-sphericity of the earth, the attraction of the Sun and Moon, solar radiation pressure, and air drag) treated as external disturbances. In general, the orbit model used for orbit control is a linear model. Model error due to linearization is treated as an unmodeled dynamic (unstructured uncertainty). The navigation and control system of the invention uses a feedback control system designed to attenuate the external perturbations and provide robustness against unstructured uncertainty. Using the Loop Transfer Recovery (LTR) technique increases robustness of the LQG controller. The Loop Shaping Procedure is used in the design of the H∞ robust optimal controller, optimizing the balance between performance and robustness.

This invention also provides a method and apparatus for providing autonomous orbital control and orbit maintenance for a satellite, providing both the strategy and the controller design to achieve this strategy while applying the concepts of modem control theory to the classical problem of orbital mechanics.

This present invention further provides an orbit control apparatus and method for converting the control problem into 1) a tracking problem and 2) a regulator design problem, where the control problem is to minimize both position error and velocity error between the satellite (also known as the pursuer) and a non-existent target satellite in an ideal orbit.

The elimination of this error with the minimum effort results in an optimal orbital control system. The present invention further provides a means for transforming orbital equations into a state-space form so that the tracking and regulator problems can be formulated. Conversion to the state-space form allows application of modern control techniques, that is, implementation of state-space form for modeling the dynamic equations of orbit control allows use of feedback control for the maintenance of the state-space point. Orbital state of a satellite is estimated from range and range rate measurements, the range and range rate measurements being derived from Global Positioning System Satellites (GPS) using Kalman filtering techniques.

Additionally, the present invention provides for the use of positioning data from other sources, such as celestial measurements, in order to estimate of the orbital state of satellites. The navigation and control system of the invention uses three variations in the design of the controller to minimize the orbital error between a satellite and the target orbit. These different design variations provide different levels of effectiveness caused by non-linearities and other systems uncertainties.

The controller design provides a GPS LQG/LTR autonomous orbit control and maintenance system for a multiple satellite constellation, resulting in a measurement state feedback control design, consisting of a minimum variance estimator (Kalman filter) and an optimal Linear Quadratic Regulator (LQR). Input to the regulator is the state estimate, and output of the regulator is the control law. The measurement controller is an LQG (linear quadratic gaussian) controller. In order to increase robustness of the LQG controller, the loop transfer recovery (LTR) technique is used.

The present invention further provides a second controller design implementing feedback control using the optimal output feedback control (OOFC). This provides complete feedback control, and there is no need for explicit determination of the satellite orbital state from the state estimator. Thus, an optimal output feedback controller can be implemented where the GPS data is the real-time direct feedback into the orbit control system The present invention still further provides a third controller design using a GPS H∞ robust controller, which uses direct input of the GPS measurement in the feedback control operations. This controller not only provides precise control performance, but also higher robustness to model uncertainty and external disturbance. Signals from GPS satellites (or alternatively from celestial measurements) are used to directly or indirectly determine the satellite orbital state, and is used in the real time feed-back loop to continuously estimate the error between a satellite and a target orbit.

Regardless of the controller being used, the feedback information is used to generate thruster commands for correction of the orbit in order to null the error. This cycle is repeated and the desired orbit is maintained. When this invention is applied to multiple satellites in a satellite constellation, orbital maintenance of individual satellites, as well as the separation and phasing between satellites operating in a constellation or formation, can be performed.

The invention can also be applied to non-orbital bodies such as launch vehicles, rockets and missiles, aircraft and submersibles, and to any object on the Earth surface having a trajectory that can be corrected and controlled using closed loop feedback control system for correction of error in position and velocity between current state and the target state. Additionally, this invention can be used for rendezvous of orbiting bodies or any interception of like or unlike bodies where one body has a trajectory that can be corrected and controlled.

It will be appreciated from the foregoing that the present invention represents a significant advance in the field of autonomous orbit control and station keeping of satellites. Other aspects of the invention will become apparent from the following more detailed description, taken in conjunction with the accompanying drawings.

Still other objects and advantages of the present invention will become readily apparent to those skilled in the art from the following detailed description, where we have shown and described only the preferred embodiments of the invention, simply by way of illustration of the best mode contemplated by us of carrying out our invention. As will be realized, the invention is capable of other and different embodiments, and its several details are capable of modifications in various respects, all without departing from the invention. Accordingly, the drawings and descriptions are to be regarded as illustrative in nature, and not as restrictive.

BRIEF DESCRIPTION OF THE DRAWINGS

The preferred embodiments will be described with reference to the drawings, in which like elements have been denoted with like reference numerals throughout the figures, in which.

DETAILED DESCRIPTION OF PREFERRED EMBODIMENTS

Figure 1:
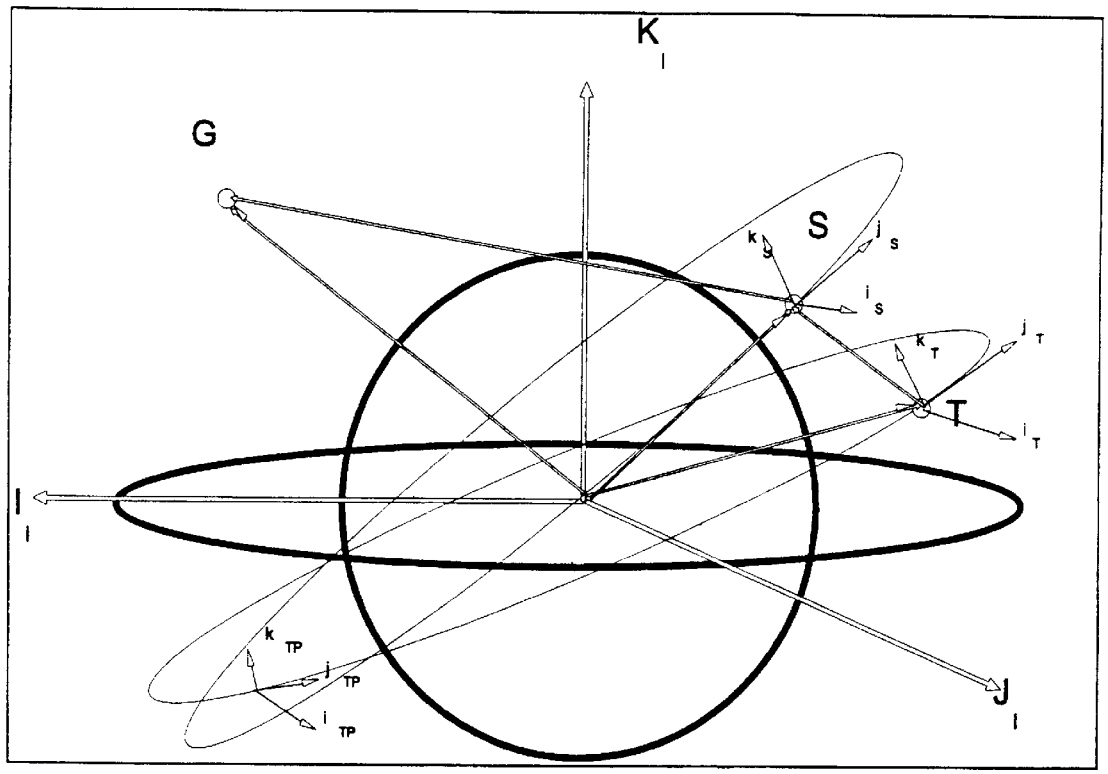
FIG. 1 is a diagram of the coordinate system used for defining the satellite and target position and target velocity of this invention.

This invention is directed to a unique system and method for autonomous orbit maintenance and orbit control of a spacecraft. In accordance with this invention, the orbit of the satellite is determined in terms of position and velocity with respect to three orthogonal axis, defined as the Earth Centered Inertial (ECI) reference frame shown in FIG. 1. Table 1 provides definitions of these reference coordinates.

TABLE 1

| | |
|---|---|
| $\{i_I j_I k_I\ 0\}$ | Geocentric Inertial Coordinate System |
| $\{i_S j_S k_S\ 0_S\}$ | Mass Center orbit Coordinate System of the Pursuer satellite |
| $\{i_T j_T k_T\ 0_T\}$ | Mass Center orbit Coordinate System of the Target satellite |
| $\{i_G j_G k_G\ 0_G\}$ | Mass Center orbit Coordinate System of the GPS satellite |
| $\{i_{SP} j_{SP} k_{SP}\ 0_{SP}\}$ | Mass Center Perigee Coordinate System of the Pursuer satellite |
| $\{i_{TP} j_{TP} k_{TP}\ 0_{TP}\}$ | Mass Center Perigee Coordinate System of the Target satellite |
| $\{i_{GP} j_{GP} k_{GP}\ 0_{GP}\}$ | Mass Center Perigee Coordinate System of the GPS satellite |

In this frame, "position" of a space vehicle is the position with respect to the earth's center, and is expressed in the inertial coordinate system. The relative position and velocity of the spacecraft with respect to a target orbital position is also defined in the same coordinate system.

The position vector of the target satellite is $r_T$. The satellite that is being controlled is called the pursuit satellite, and the position vector of the pursuit satellite is denoted by $r_s$.

The positioning vector for the orbiting satellite, also known as the pursuit satellite, is $r_s$. The sought after position vector, that is, the position vector of the satellite when it reaches the target location is $r_T$. For a two body solution, the pursuit satellite is required to approach the fictional location of a fictional target satellite. Substituting $r_s$ and $r_T$ into Newton's Law of Universal Gravitation and the second law of motion, the result is the two body differential equation:

$$\ddot{r}_T = -\frac{\mu}{r_T^3} r_T \quad (1)$$
$$\ddot{r}_s = -\frac{\mu}{r_s^3} r_s + \underline{\mu}$$

In order to obtain a compact form of the equation, the time variable can be replaced by $\theta_t T$. The differential respect to time and to $\theta$ are different. They are $$\frac{dx}{dt} = \dot{x} \quad \frac{dx}{d\theta} = x' \quad (2)$$
$$\frac{dx}{dt} = \dot{\theta}\frac{dx}{d\theta}$$

The relationship of the two-body problem can be converted into the following relative dynamics equations:

$$x_{1'} - 2x_{2'} - \frac{3}{1+e\cos\theta}x_1 = u_1 \quad (3)$$
$$x_{2''} + 2x_{1'} = u_2$$
$$x_{3''} + x_3 = u_3$$

Equation (3) can be written as two groups of state equations, as noted below: In the orbit plane:

$$\frac{d}{d\theta}\begin{bmatrix} x_1 \\ x_2 \\ x_{1'} \\ x_{2'} \end{bmatrix} = \begin{bmatrix} 0 & 0 & 1 & 0 \\ 0 & 0 & 0 & 1 \\ \frac{3}{1+e\cos\theta} & 0 & 0 & 2 \\ 0 & 0 & -2 & 0 \end{bmatrix}\begin{bmatrix} x_1 \\ x_2 \\ x_{1'} \\ x_{2'} \end{bmatrix} + \begin{bmatrix} 0 & 0 \\ 0 & 0 \\ 1 & 0 \\ 0 & 1 \end{bmatrix}\begin{bmatrix} u_1 \\ u_2 \end{bmatrix} \quad (4)$$

Out of orbit plane:

$$\frac{d}{d\theta}\begin{bmatrix} x_3 \\ x_{3'} \end{bmatrix} = \begin{bmatrix} 0 & 1 \\ -1 & 0 \end{bmatrix}\begin{bmatrix} x_3 \\ x_{3'} \end{bmatrix} + \begin{bmatrix} 0 \\ 1 \end{bmatrix} u_3 \quad (5)$$

LQR Controller:

For the LQR controller, consider the time-invariant regulator problem for the system $$\dot{x}(t) = Ax(t) + Bu(t)$$
$$y = Cx(t) \quad (6)$$

and the criterion $$\int_{t_0}^{t_1}[y(t)^T Q y(t) + u(t)^T R u(t)]dt + x^T(t_1)P_1 x(t_1) \quad (7)$$

The Riccati Equation is:

$$-\dot{P} = y^T Q y - P(t)BR^{-1}B^T P(t) + A^T P(t) + P(t)A$$
$$P(t_1) = P_1 \quad (8)$$

If the system is stabilizable and detectable, P is the unique nonnegative definite symmetric solution of the algebraic Riccati equation.

The steady-state control law $$u(t) = K_c x(t)$$
$$K = R^{-1}B^T P \quad (9)$$

is asymptotically stable if and only if the system is stabilizable and detectable. If the system is stabilizable and detectable, the steady-state control law minimizes $$\int_{t_0}^{\infty}[y^T Q y + u^T R u]dt \quad (10)$$

and the criterion takes the value $$x^T(t_0)Px(t_0) \quad (11)$$

The preferred embodiment of the navigation and control system of this invention is the use of signals from the GPS satellites to determine the orbital information of the spacecraft to be controlled. From a given LEO orbital position, multiple GPS satellites are visible. Preferably, the navigation and control system uses simultaneous signals from four GPS satellites. For spacecraft that are in higher orbits and/or outside of GPS coverage, data from celestial measurements may be substituted in order to determine the present orbit. Feedback control systems use this orbit information as an input, processing the information and outputting closed-loop correction instructions to actuate thrusters on the spacecraft to continuously correct errors in position and velocity. Other embodiments of the navigation and control system of this invention provide differing amounts of controllability and robustness for different environments.

Figure 2:
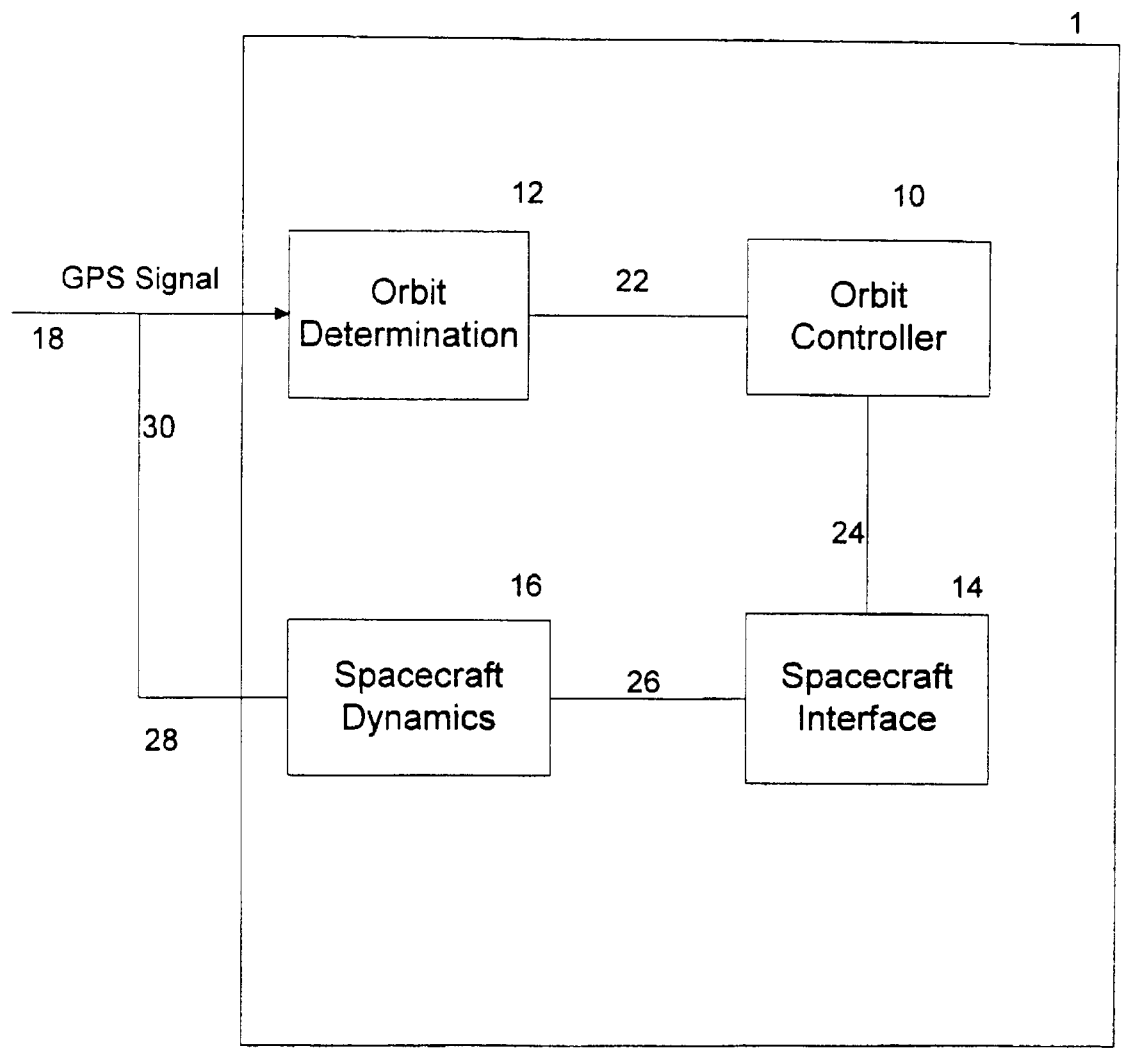
FIG. 2 illustrates the first embodiment of the navigation and control system of this invention.

FIG. 2 illustrates one embodiment of the navigation and control system of this invention. An orbit controller 10 determines the control action that has to be taken by the spacecraft, for example, thrusting, in order to correct orbital position and velocity as determined from GPS signal data 18. This invention provides three different controllers 10, 11 and 13, having different characteristics and capabilities:

1. a linear quadratic Gaussian controller with Loop Transfer Recovery (LQG/LTR controller),
2. an optimal output feedback controller (OOFC), and
3. an $H_\infty$ robust controller.

Linear Quadratic Gaussian (LQG) control theory goes beyond the traditional PID controllers and is one of the new "powerful" design tools. The LQG theory assumes that the system under control has a known linear (and possibly time-varying)description, and that the exogenous, or external, noises and disturbances impinging on the feedback system are stochastic, but have known statistical properties. Performance criteria for this controller involve minimizing quadratic performance indices. Additionally, this theory offers a true synthesis procedure. Once a designer has settled on a quadratic performance index to be minimized, the procedure supplies the unique optimal controller without further intervention from the designer.

However, LQG optimizes performance but not robustness. Further, LQG designs can exhibit arbitrarily poor stability margin. Common Kalman filters can be used so that full-state feedback properties can be "recovered" at the input of the system. This technique is known as Loop Transfer Recovery (LTR), and enhances the robustness of an LQG design.

In the first embodiment of the navigation and control system of this invention shown in FIG. 2, an LQG/LTR controller 10 is used. The GPS signal 18 provides the orbital information to the spacecraft. This GPS signal is used by an orbit determination system 12. The result is an estimated orbit, which is then fed into the orbit controller 10. The controller 10 outputs the velocity change requirements that the spacecraft requires in order to correct its position and velocity error. This information is used by the spacecraft interface system 14, which transforms the velocity change requirement into actual thruster activity by taking into account the propulsion system of the spacecraft. The resulting thrusting activity changes the satellite orbit dynamics 16 resulting in a corrected orbit. This whole process is continuous, indicated by the flow line 30, and the closed loop feedback control system provides continuous orbital correction.

Figure 3:
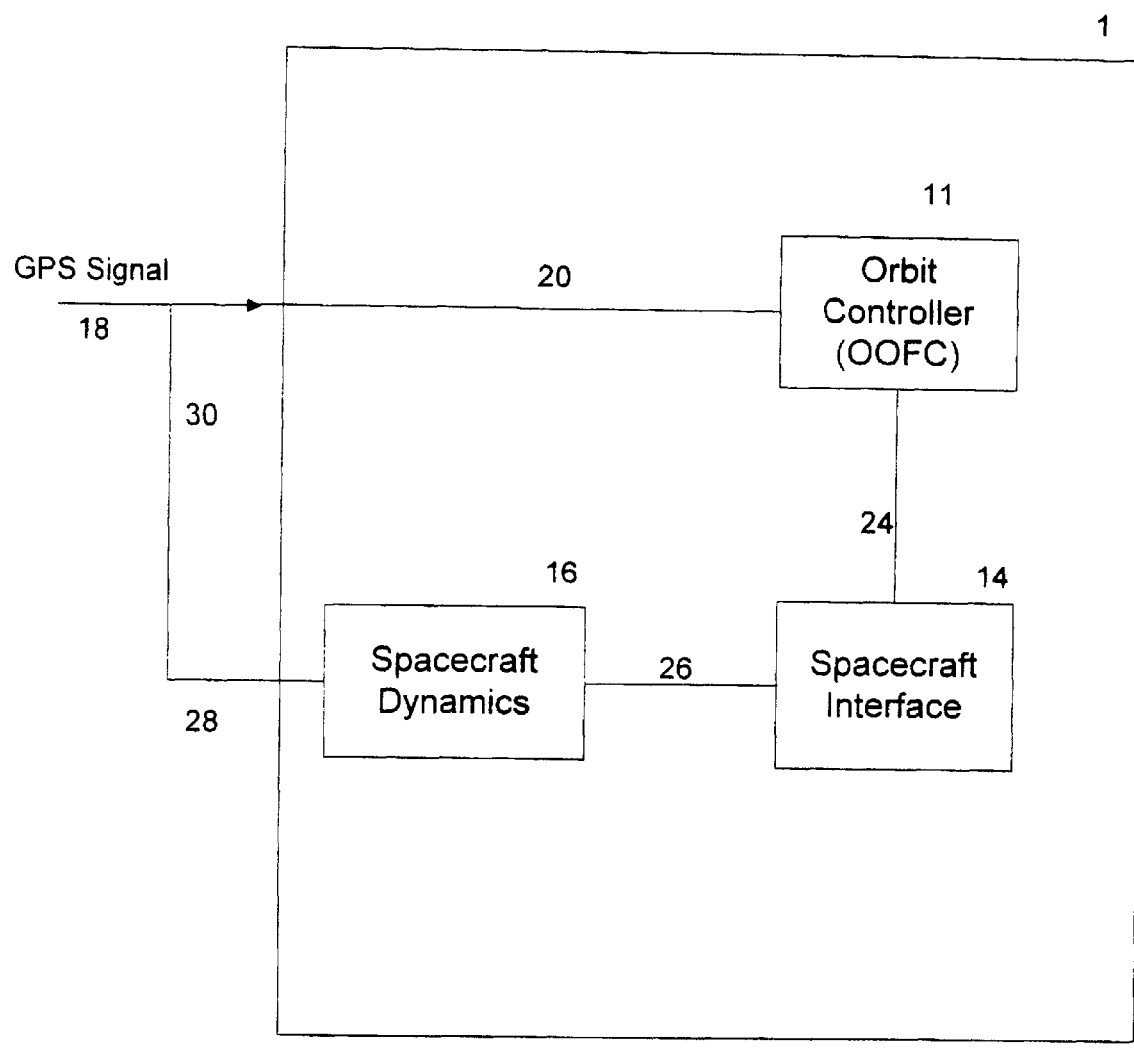
FIG. 3 illustrates the second embodiment of the navigation and control system of this invention.

In the second embodiment of the navigation and control system of this invention shown in FIG. 3, an OOFC 11 is used. In this embodiment, the observed variable serves as input to the controller, thus the OOFC 11 operates as an observer through which the state of the system is reconstructed. A control law is developed which is an instantaneous linear function of the reconstructed state. This control law is the same control law that would have been obtained if the state had been directly available for observation. However, in order to use OOFC 11, it is necessary to establish relationships between the measurements and the state variables of the output feedback system. Thus, the GPS signal 18 provides the orbital information to the spacecraft, and is fed into the orbit controller 11. The controller 11 outputs the velocity change requirements that the spacecraft requires in order to correct its position and velocity error. This information is used by the spacecraft interface system 14, which transforms the velocity change requirement into actual thruster activity by taking into account the propulsion system of the spacecraft. The resulting thrusting activity changes the satellite orbit dynamics 16 resulting in a corrected orbit. This whole process is continuous, indicated by the flow line 30, and the closed loop feedback control system provides continuous orbital correction.

Figure 4:
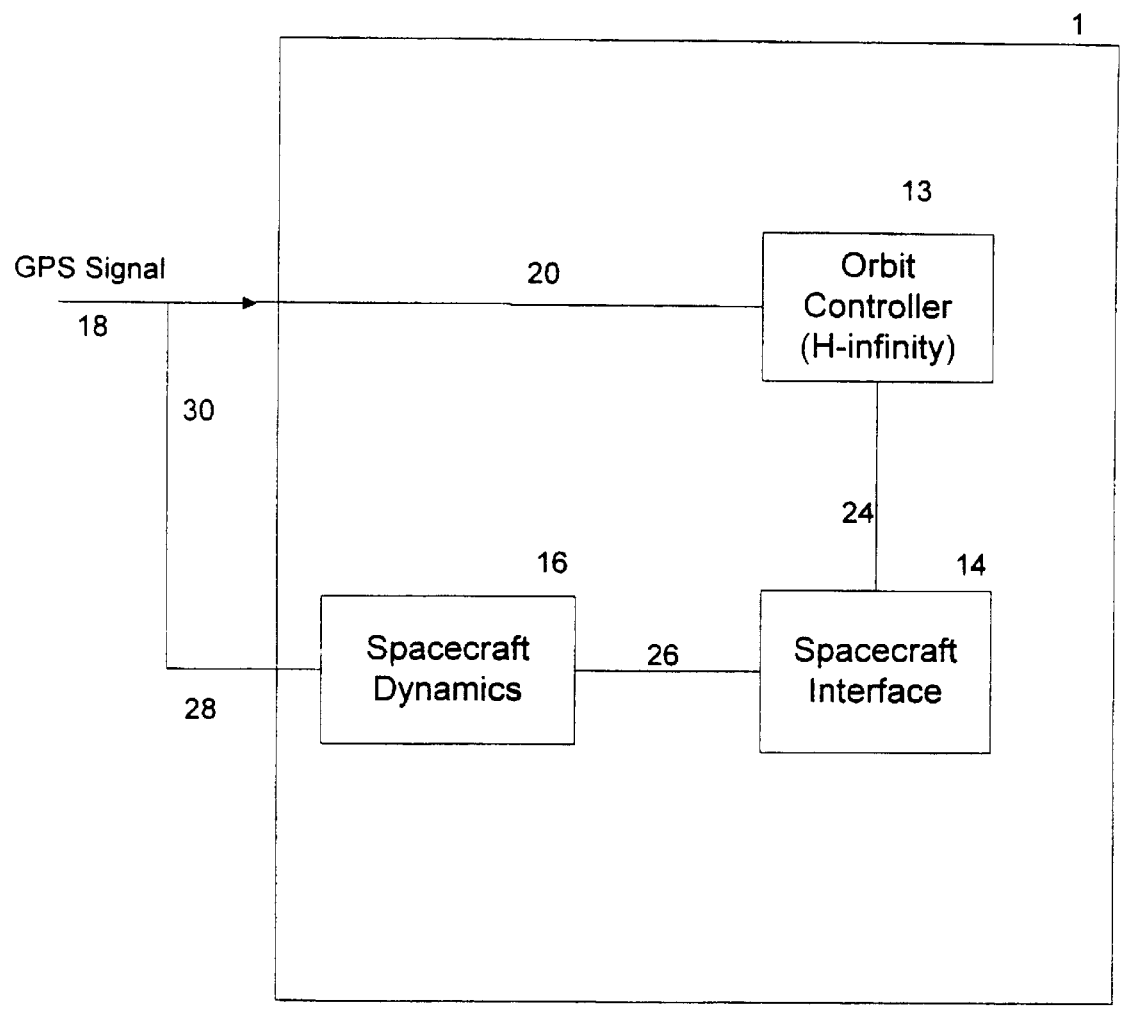
FIG. 4 illustrates the third embodiment of the navigation and control system of this invention.

In the third embodiment of the navigation and control system of this invention shown in FIG. 4, an $H_\infty$ robust controller 13 is used. Many real problems do not have accurate models and the statistical nature of external disturbances impinging on the system are generally unknown. The H-Infinity Robust Controller 13 utilizes a control theory that deals with the question of system modeling errors and external disturbance uncertainty.

The H-Infinity controller 13 utilizes frequency-domain optimization and synthesis theory that was developed in response to the need for a synthesis procedure that explicitly addresses questions of modeling errors. Generally, the basic philosophy is to treat the worst case scenario: plan for the worst and optimize.

The controller 13 must be capable of dealing with system modeling errors and unknown disturbances. Additionally, the controller 13 must be amenable to meaningful optimization and must be able to deal with multivariable problems. Robustness implies systems that can tolerate system variability and uncertainty. H-Infinity theory involves the concept of maximum modulus principle. Generally, if a function of a complex variable is analytic inside and on the boundary of some domain, then the maximum modulus of the function occurs on the boundary of the domain. This concept is extended to the concept of infinity norm. H-Infinity is a quantity that satisfies the axiom of a norm that provides an asymptotically stabilizing controller.

Thus, in this third embodiment shown in FIG. 4, the GPS signal 18 provides the orbital information to the spacecraft and is fed into the orbit controller 13. The controller 13 outputs the velocity change requirements that the spacecraft requires in order to correct its position and velocity error. This information is used by the spacecraft interface system 14, which transforms the velocity change requirement into actual thruster activity by taking into account the propulsion system of the spacecraft. The resulting thrusting activity changes the satellite orbit dynamics 16 resulting in a corrected orbit. This whole process is continuous, indicated by the flow line 30, and the closed loop feedback control system provides continuous orbital correction.

Figure 5:
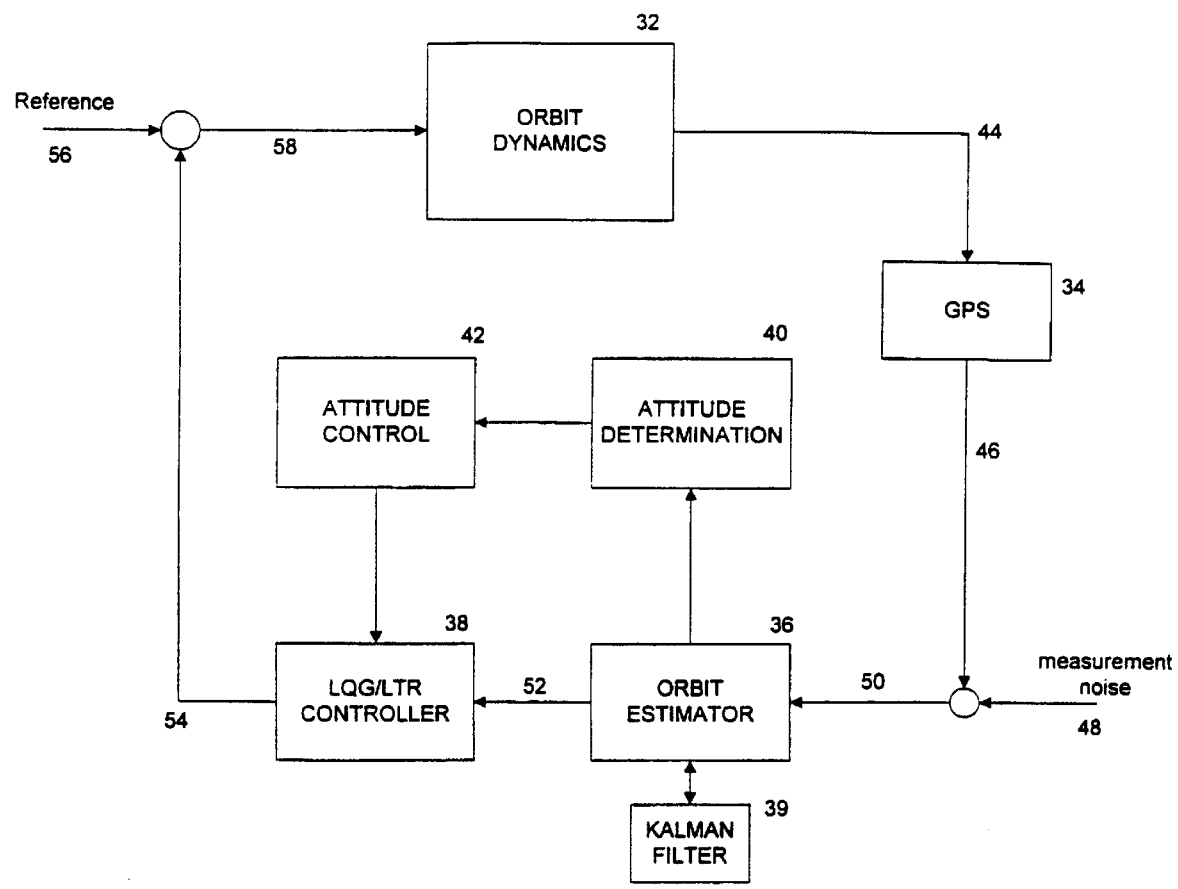
FIG. 5 is a block diagram of an autonomous orbit feedback control/maintenance system using LQG/LTR controller used in the first embodiment of this invention.
Figure 6:
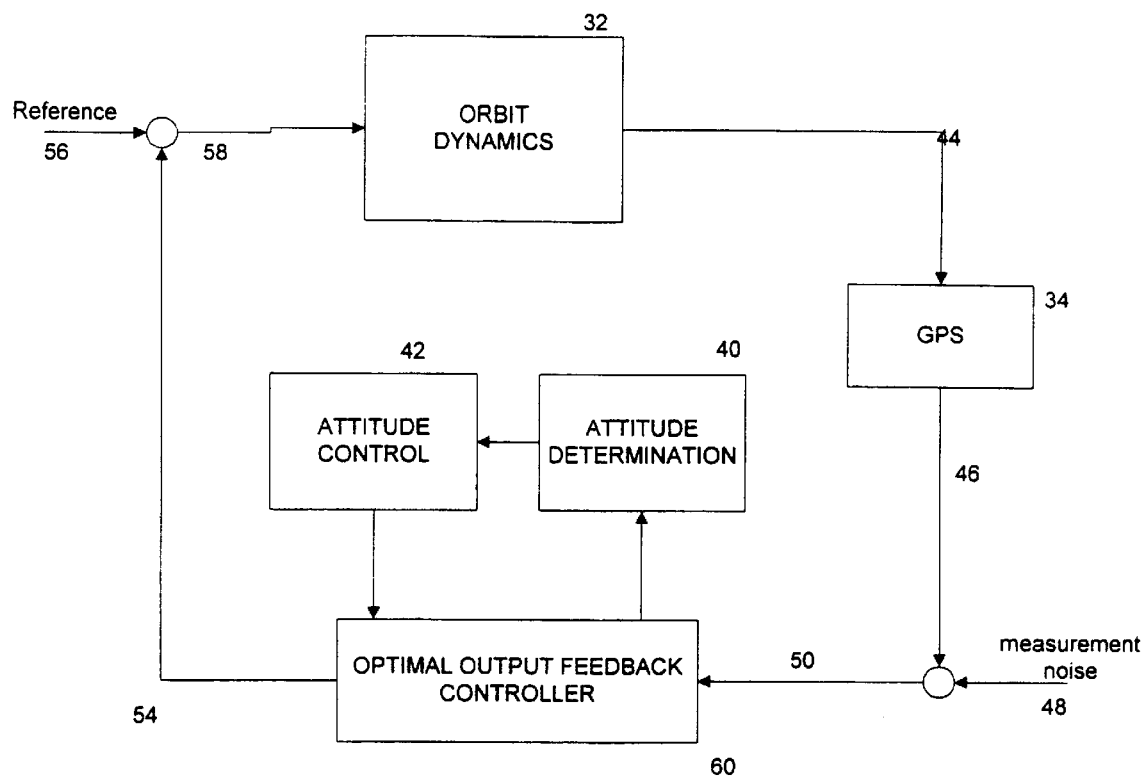
FIG. 6 is a block diagram of an optimal output feedback controller (OOFC) using GPS input used in the second embodiment in this invention.
Figure 7:
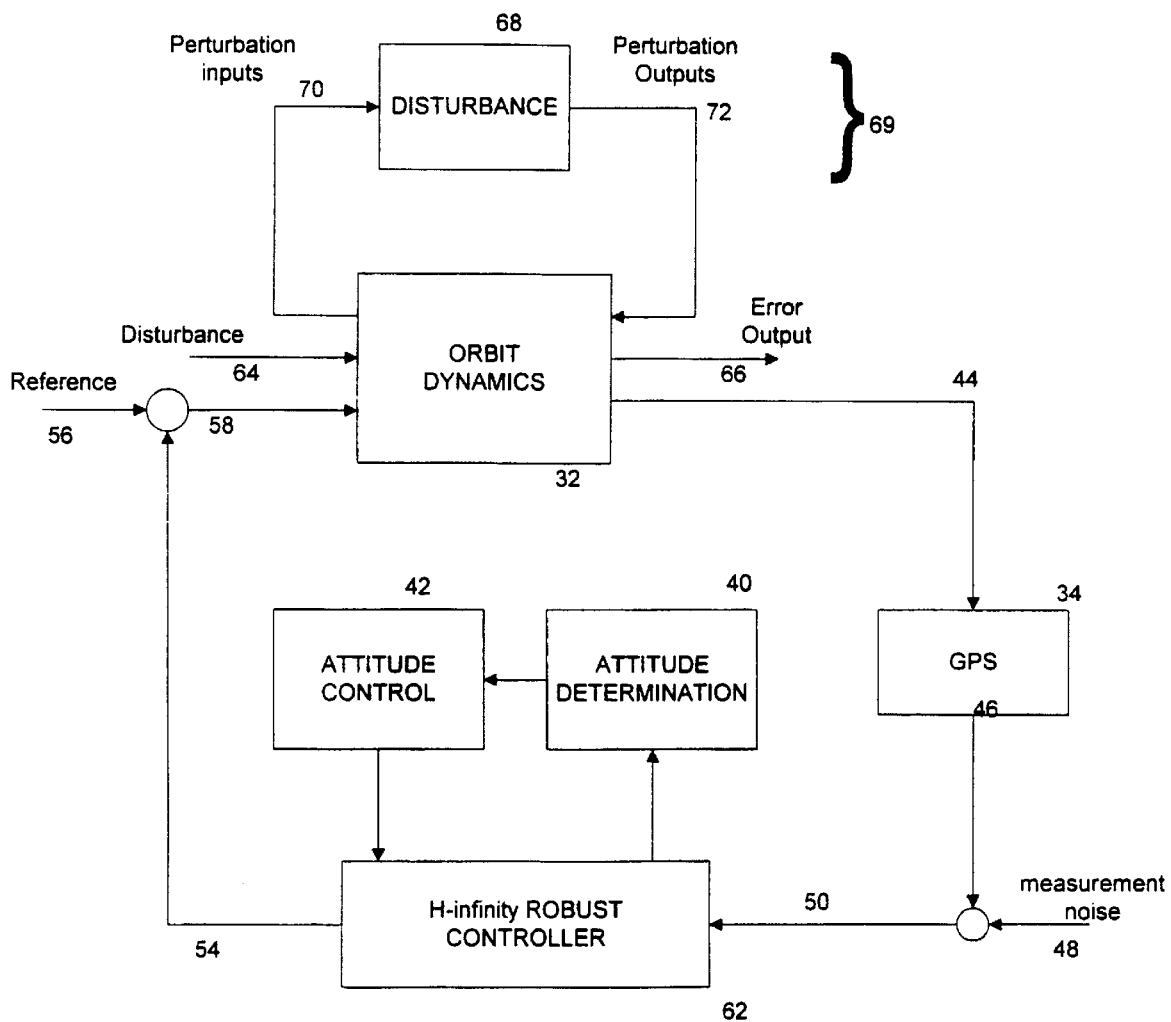
FIG. 7 is a block diagram of an autonomous orbit feedback control/maintenance system using H∞ robust controller in the third embodiment in the controller design of this invention.
Figure 1:
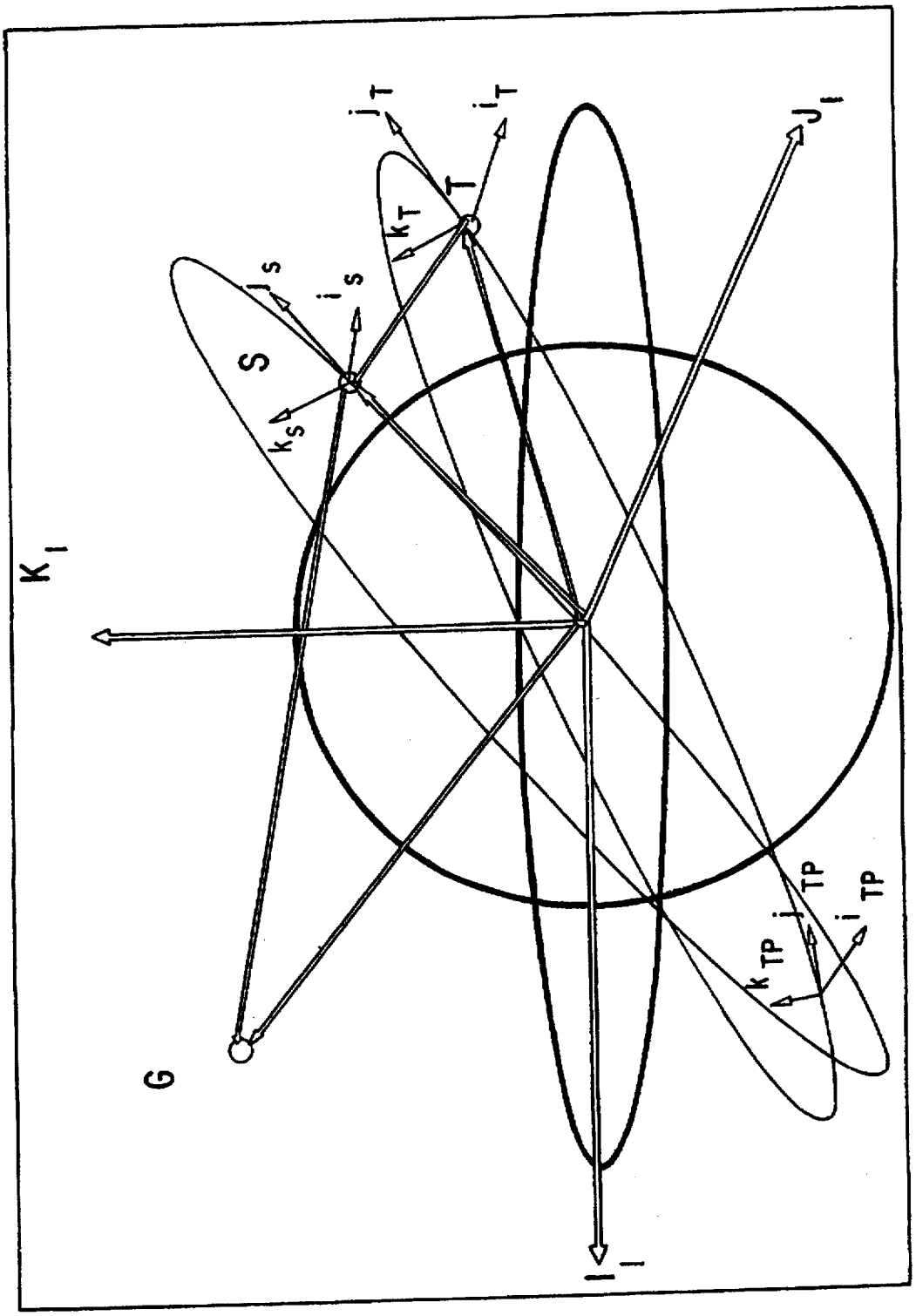
Figure 2:
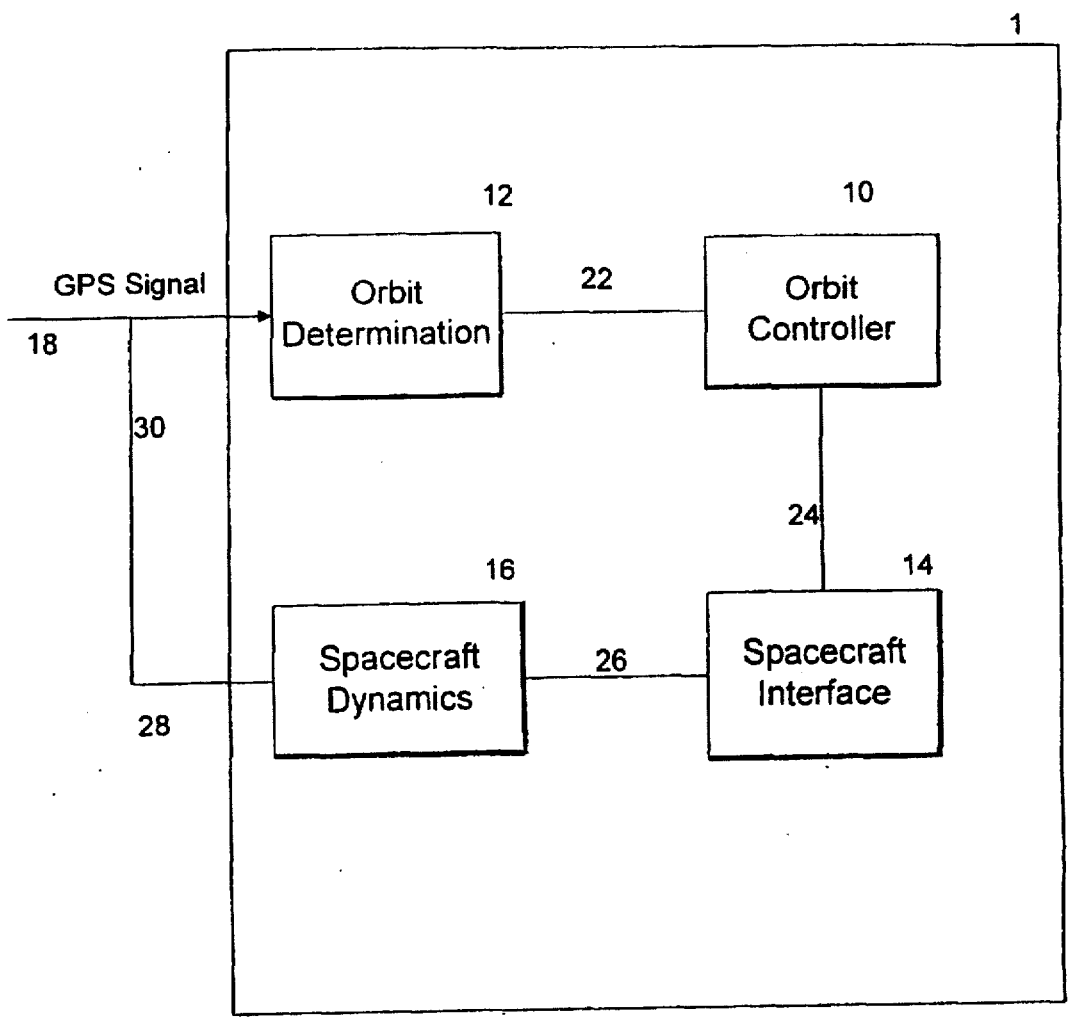
Figure 3:
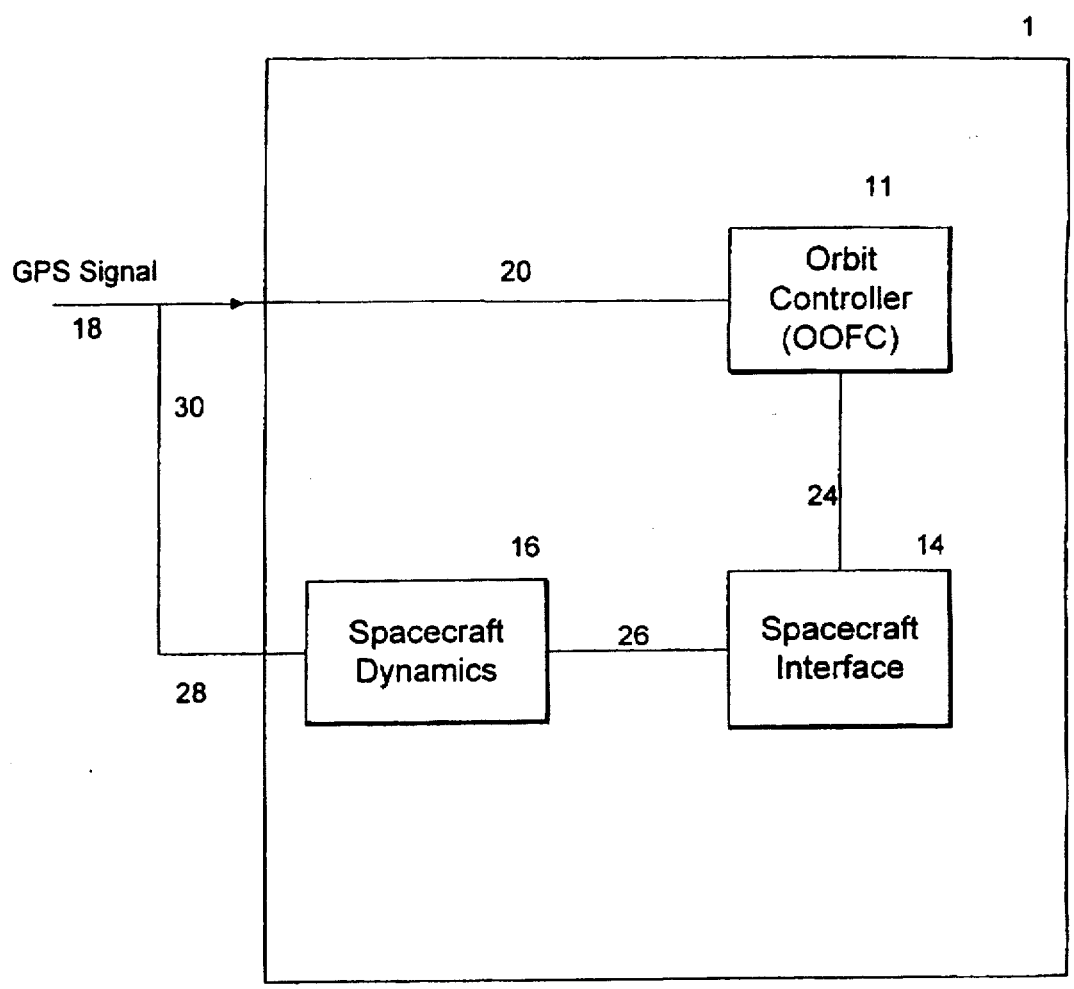
Figure 4:
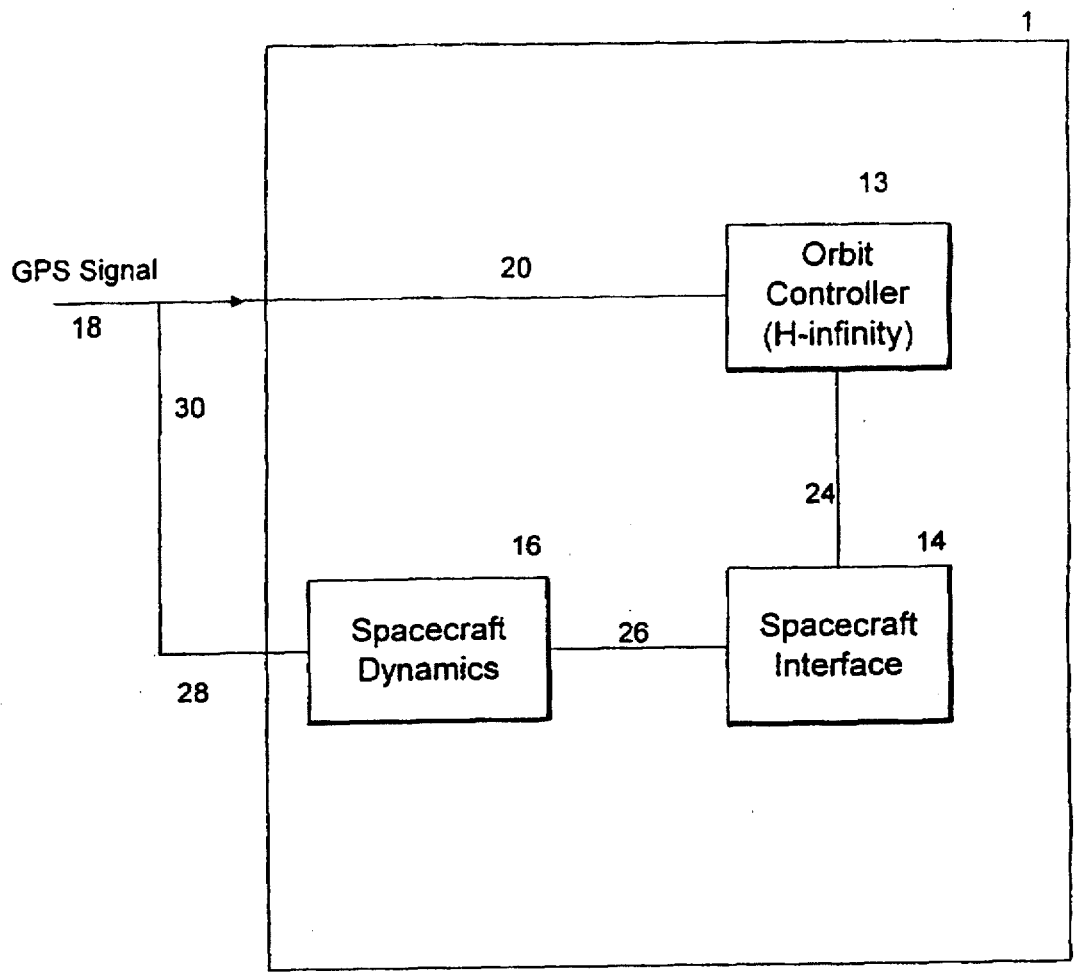
Figure 5:
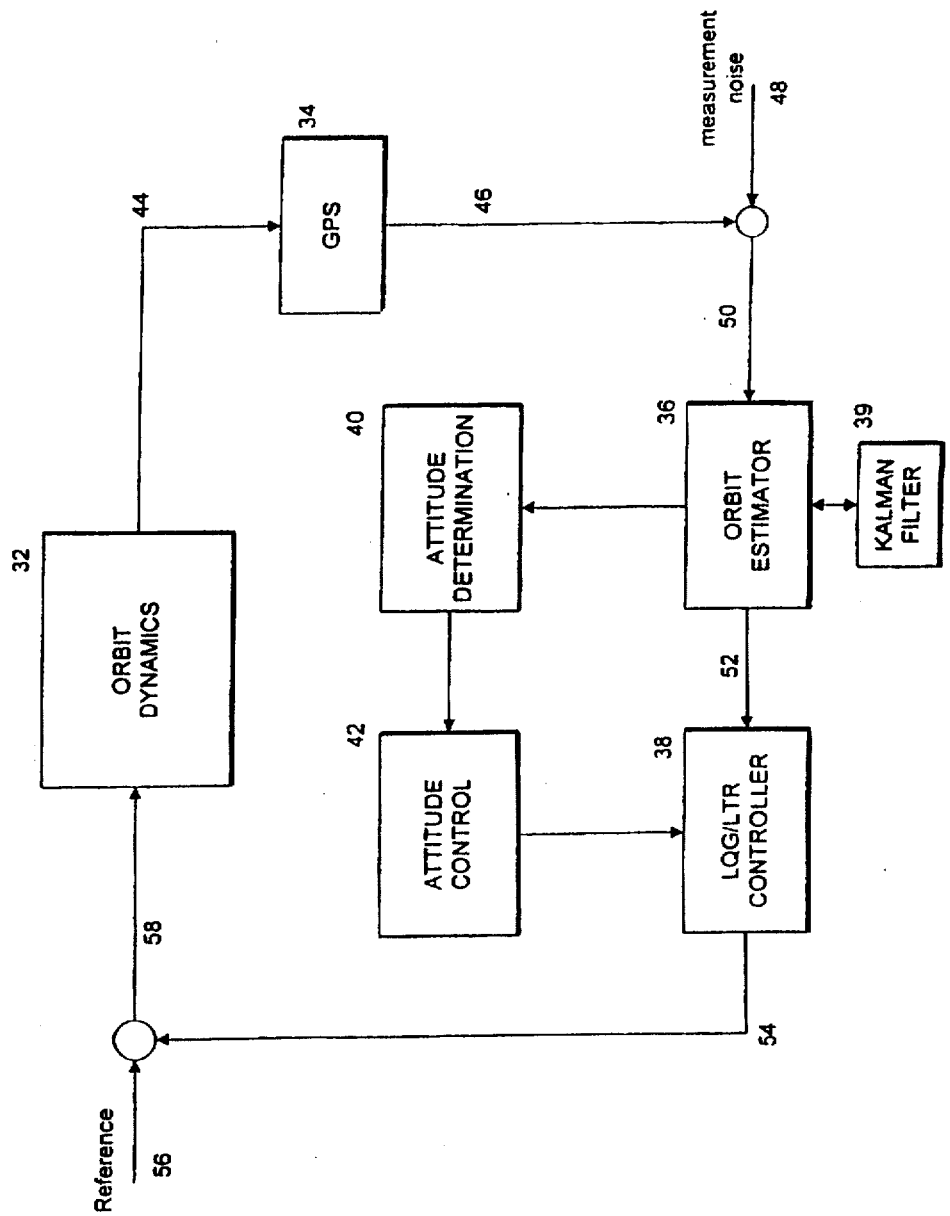
Figure 6:
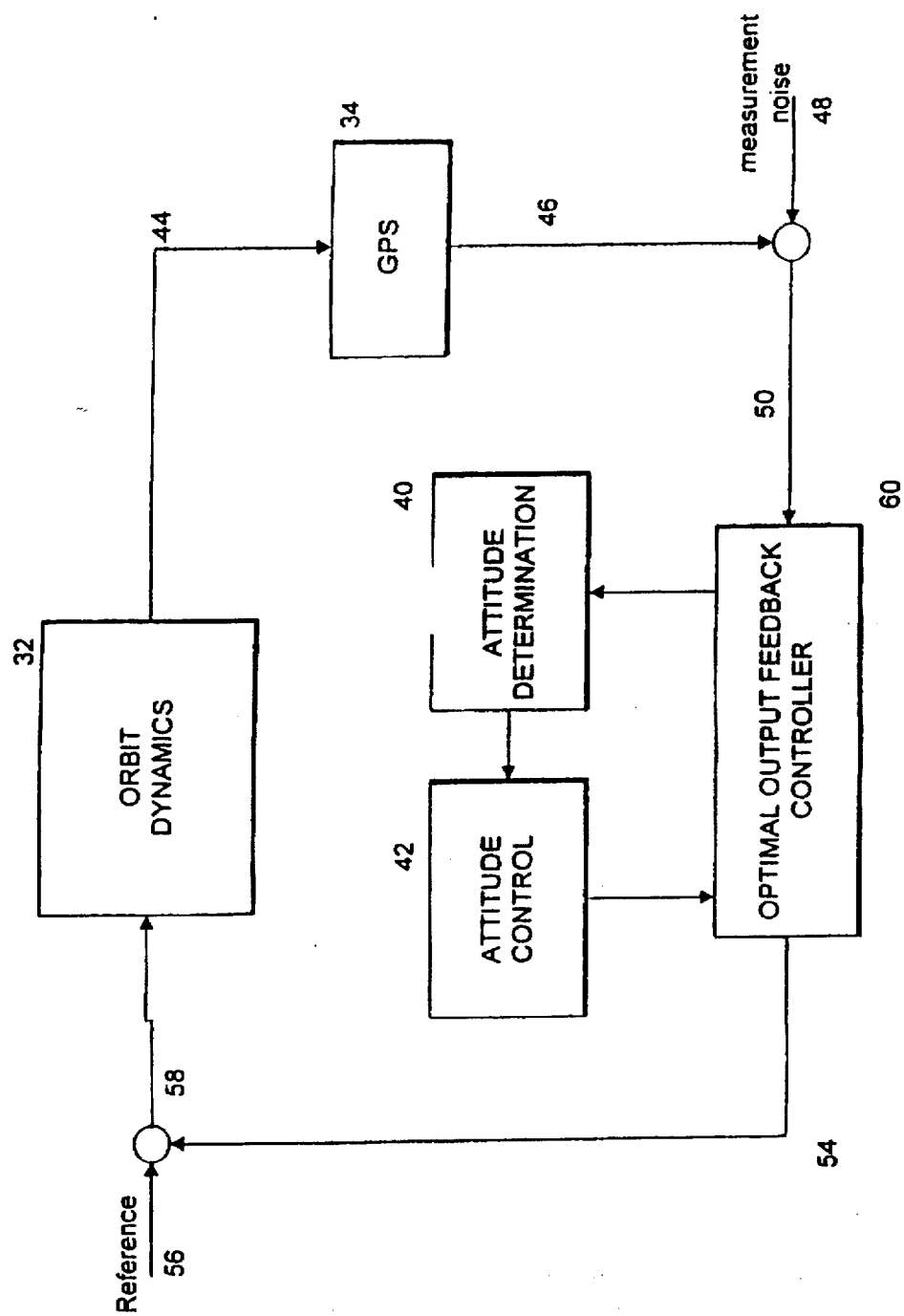
Figure 7:
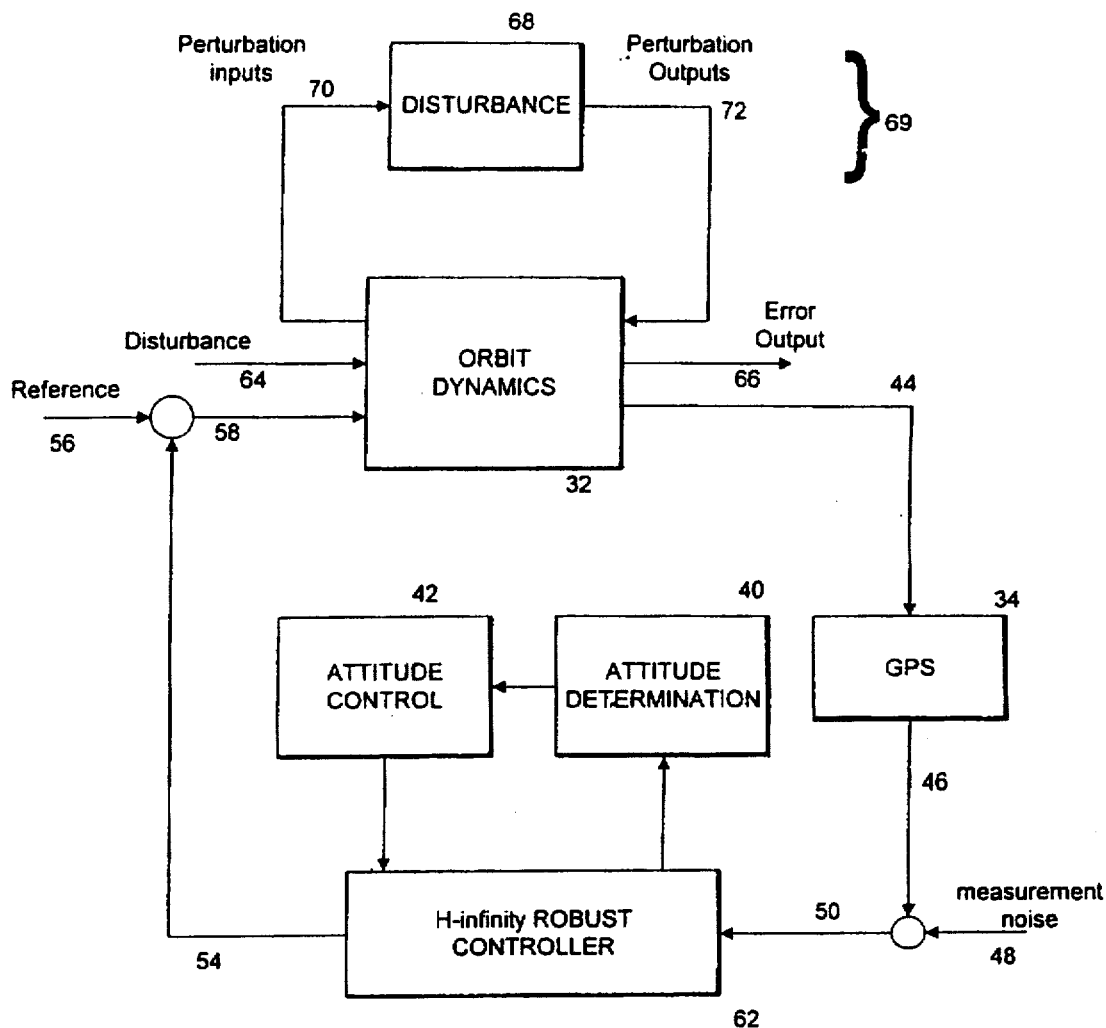

FIGS. 5, 6 and 7 functionally describe the three variations of the invention. The descriptions of the elements common to all three designs will be addressed first, followed by a description of each of the three individual controller designs: the LQG/LTR controller shown in FIG. 5, the optimal output feedback controller shown in FIG. 6, and the $H_\infty$ robust controller shown in FIG. 7.

To design an orbit control system, the satellite dynamics 32 must incorporate the orbit control problem, which is set up so that feedback control techniques of modem control theory are applied. A set of suitable orbital elements in the form of both 1) state-space variables and 2) a set of dynamic equations to be structured using the state-space variables must be developed.

The state-space is used for modeling the dynamic equations of the orbit control used by modem control theory. A spacecraft orbit solution of a two-body problem can be determined by a set of six orbital elements representing the state variable as a point in the state-space. Perturbing forces, such as the non-spherical gravitational effect of earth, the gravitational effects of the moon and sun, solar pressure and atmospheric drag cause the original two-body solution to be replaced by a changed set of orbital parameters. The original state-space point will have moved to a new point position in the orbit state-space. Thus, the station-keeping controller pulls back the new point position to the original point position. Orbit control problems, such as the post-launch station acquisition, can also be solved by putting a given point position to a designated point position in the orbital state-space. The station-keeping problem for a large constellation in multi-satellite orbits can be solved in the same manner.

In the state-space equations of orbital motion, the orbital control problem is converted into a tracking and regulator problem, where the control task is to minimize the position and velocity error between a pursuer satellite S and a target T. This provides the versatility that this invention has in that the target satellite can be in any orbit, subject to the GPS envelope, and the initial error can be very small, for station-keeping, or very large, for post-launch station acquisition.

Positioning a satellite into the target space location is thus treated as a tracking problem. The desired space location being tracked is called a "target satellite", even though there is no real satellite in the target position. The relationship of the two-body problem can be converted into two sets of relative dynamic equations of motion. In this manner, the orbital state is converted into a state-space system that lends itself to the desired controller design.

In FIG. 5, the orbit dynamics output 44 of a satellite can be estimated by measuring signals 46 from the Global Positioning System (GPS) satellites 34. The GPS signals 18 result in signal outputs 46, which are ranges deduced from measured time or phase differences based on a comparison between received signals and receiver generated signals. Unlike terrestrial electronic distance measurements, GPS uses a "one-way concept" where two clocks are used, one in the satellite and the other in the receiver. In particular, simultaneous measurement from at least 4 GPS satellites are required to implement the controllers of this invention, including range and range rates.

The GPS signal outputs 46, corrupted by measurement noise 48, provides the input 50 to the orbit estimator 36. Orbit estimation involves setting up the proper state equations, including state transition matrices for the propagation of the orbital parameters in time. The equation of motion has to model all the disturbing accelerations listed in Table 2.

Kalman Filtering 39 is applied to the orbit differential correction. Kalman filtering is well known in the art, for example, see *Introduction to Random Signals and Applied Kalman Filtering* (2nd Edition) by R. G. Brown et al. 1993, incorporated herein by reference, thus Kalman filtering does not need to be discussed herein in detail. Computational inaccuracies in the error covariance update equation can cause the computed error covariance to not only become numerically inaccurate, but also to lose its symmetry and positive semi-definiteness. When this happens, divergence occurs.

TABLE 2

Sources for disturbing accelerations

| | |
|---|---|
| Gravitational | Non-sphericity of the earth |
| | Tidal attraction (direct and indirect) |
| Non-gravitational | Solar radiation pressure (direct and indirect) |
| | Air drag |
| | Relativistic effect |
| | Other (solar wind, magnetic field forces, etc.) |

When divergence is due to significant computer round-off error in the implementation of the Kalman filter algorithm, it can be eliminated by applying an alternative form of the algorithm which is mathematically equivalent to the Kalman filter 39 when perfect arithmetic is assumed, resulting in significantly improved performance against computer round-off error.

Many methods are available for decreasing the sensitivity of the Kalman filter 39 to round-off errors, for example, the square root covariance filters, the U-D covariance filters, and the square root information filters. The U-D filter is used for the orbit differential correction task in the controllers of this invention because the U-D covariance filters use a modified (square-root-free) Cholesky decomposition of the covariance matrix:

$$P = U \cdot D \cdot U^T$$

where P is the covariance matrix, U is the transformation matrix that transforms the P matrix into the diagonal matrix D and $U^T$ is the transpose of the matrix U.

To determine the initial orbit, trilateration is used. That is, the initial orbit is determined using simultaneous range and range-rate measurements. Additionally, this method can also be changed into using the simultaneous range data and reduction to two-position vector and time interval problem.

FIG. 5 shows an LQG/LTR controller 38. The LQG/LTR controller 38 obtains and or maintains the desired orbit state by implementing a real-time closed loop feedback control on the orbital elements. This LQG/LTR controller 38 includes an optimal linear quadratic regulator (LQR) and the linear minimum variance estimator (Kalman Filter) 39. FIG. 5 shows the design of an orbit feedback control system using the LQG/LTR controller 38.

Output from the Orbit Estimator 52 is the estimate of orbital elements which are fed into the LQG/LTR Controller 38. Controller 38 determines the error in orbital position and velocity, and the correction required to reduce the error between the target and satellite. The Controller generates and outputs the required maneuver plans and commands 54 that will be performed by the satellite propulsion system. Output 54 is added to a reference command 56 to change target position, resulting in thruster actuation input command 58. The orbital condition at a subsequent time step is again determined by this feedback loop and the process repeated continuously, thereby removing error between a satellite and a target position, and between a satellite and target velocity, maintaining the desired orbit.

Attitude determination 40 and attitude control 42 are used when it is possible to determine the spacecraft attitude from GPS signal: the attitude of the satellite affecting the velocity change obtained when a maneuver is performed.

The GPS Optimal Output Feedback Controller (OOFC) 60 in FIG. 6 can be used for real-time direct feedback for orbit control. GPS data 50 is input to the OOFC 60. In order to develop the GPS observational equation it is necessary to establish the relationships between the measurements and the state variables of the output feedback system.

GPS data 50 are fed directly into the OOFC 60 without explicitly determining the orbit. The OOFC 60 determines the error in orbital position and velocity directly from the GPS data 50, outputting the correction requirement 54 to reduce the error between the target and satellite. The OOFC 60 generates both the required maneuver plans and the commands that the satellite propulsion system will perform, providing input 58 into orbit dynamics 32. The measurement of the orbital condition at subsequent time steps are again determined by this feedback loop and the process continuously repeated, thereby removing error between satellite and target position and velocity and maintaining the desired orbit.

If range, or a combination of range and range rates, are the GPS signal outputs 46, there can be multiple observation models that can be used for the control system. The quality of the observational model depends on its observability, and a numerical measure of the degree of the observability needs to be used for the comparison between the different observation models and eventual selection of an observational model. The degree of observability for the observation model is the numerical measure of the quality of the model. The higher the degree of observability, the higher is the estimation accuracy for using this model. Based on the numerical values of the various observation models, Table 3, the observational model $H_5$ (4 range data+1 range rate data) is the best one to be used in a time invariant linear observational model. The observation models $H_1$ (4 range data) and $H_4$ (3 range+1 range rate data) are also acceptable. However, $H_2$ (1 range+1 range rate data) and $H_3$ (2 ranges+2 range rates) are unacceptable observation models. Simulations have confirmed the theoretical conclusion that $H_5$ is the optimum observation model.

TABLE 3

The Degree of the Observability for Various Observational Models

| Model of Observability | Eigenvalues of $W_o$ | Degree of Observability $\mu_1$ | Degree of Observability $\mu_2$ | Degree of Observability $\mu_3$ |
|---|---|---|---|---|
| $H_1$ - Acceptable model | 0.0062 0.0062 1.6542 1.6542 2.3681 2.3681 | 0.0062 | 0.0078 | 0.2169 |
| $H_2$ - Unacceptable model | 0.0000 0.0000 0.0000 0.0000 1.0099 2.0199 | 0.0 | 0.0 | 0.0 |
| $H_1$ - Unacceptable model | 0.0000 0.0000 0.8277 1.1871 1.6553 2.3781 | 0.0 | 0.0 | 0.0 |
| $H_4$ - Acceptable model | 0.0025 0.0029 1.1890 1.4744 1.8234 2.5476 | 0.0025 | 0.0081 | 0.1976 |
| $H_5$ - The best model | 0.0026 0.0029 1.6542 2.3123 2.3681 2.7197 | 0.0026 | 0.0082 | 0.2393 |

$H_\infty$ controller 62 in FIG. 7 is also an output feedback control design where the feedback information is the direct orbit measurement GPS data 50, which is input to the controller 62, thereby obviating the need for explicit estimation of the orbital state from an orbit estimator. Use of $H_\infty$ robust controller 62 provides greater robustness to the feedback control loop, increases the operating range of the system, and enhances the convergence and stability of the control loop.

The controller 62 determines the error in orbital position and velocity directly from GPS measurements 50, and outputs correction 54 to reduce the error between the target and the satellite. Correction 54 is added to any external command 56, resulting in input 58 representing the required maneuver plans and commands that the satellite propulsion system (not shown) will perform. Measurement of the orbital condition at subsequent time steps are again determined by this feedback loop and the process is continuously repeated, thereby removing error between satellite and target position and satellite and target velocity, thereby maintaining the desired orbit.

The robustness of controller 62 is also improved by incorporation of a disturbance estimator loop 69, which includes perturbation inputs 70, disturbance estimator 68 and perturbation outputs. This information is used for disturbance rejection that is a part of the $H_\infty$ controller design.

It will be appreciated from the foregoing description that the present invention represents a significant improvement in the development of autonomous orbit control and maintenance system. In particular, the invention provides this control using a unique closed-loop feedback system that provides continuous control of the orbital parameters.

It will also be appreciated that variations of the predetermined target position error ($\Delta P$) and target velocity error ($\Delta V$) of the body being controlled results in differing results, for example, $\Delta P=0$, $\Delta V=0$ for a satellite, the result is orbit correction when the target is a phantom $\Delta P=0$, $\Delta V=0$ for a body, the result is rendezvous with another body when the target is another body $\Delta P=0$, $\Delta V\neq 0$ for a body, the result is interception with another body when the target is another body $\Delta P\neq 0$, $\Delta V=0$ for a body, the result is the body remaining a predetermined distance for the target.

Other important aspects of the invention are the use of three different Controllers —LQG/LTR, OOFC, and $H_\infty$ Controllers, each using input signals from GPS and outputting commands for spacecraft thruster activity to correct error in orbital position and velocity.

It will also be appreciated that, although a specific embodiment of the invention has been described in detail for purpose of illustration, this invention is applicable to any orbiting body, manned or unmanned, in orbit around the earth, sun or any planetary body. It will also be appreciated that this invention is applicable to objects having trajectory control, as well as for aircraft that require trajectory control and control of single satellites, constellation of satellites, and a group of satellite flying in formation.

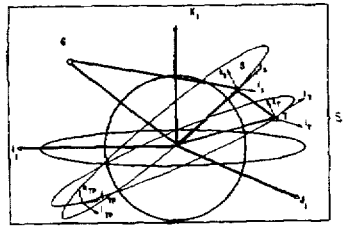
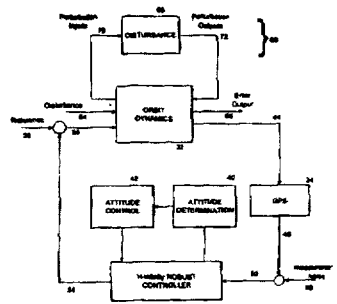

What is claimed is:

1. An on-board system for a free body in motion comprising:
    a closed loop multivariable controller;
    a receiver that receives positioning data; and
    a converter that converts a control problem into a state-space form; wherein the controller uses the positioning data to determine the free body's+ position in an inertial coordinate system and uses the state-space form to determine if the position of the free body needs to be altered in real time for minimization of at least one of position, position error, velocity and velocity error between the free body and a target.

2. The system according to claim 1 wherein the target is a phantom target and the control problem is converted to a tracking problem and a regulator problem for minimization of position error and velocity error between the free body and phantom target.

3. The system of claim 1 wherein the controller is a Linear Quadratic Gaussian/Loop Transfer Recovery Controller.

4. The system of claim 1, wherein the controller is an Optimal H-Infinity Robust Controller.

5. The system of claim 1, wherein the controller is an Optimal Output Feedback Controller.

6. The system of claim 1, wherein the positioning data is range data.

7. The system of claim 1, the positioning data is range-rate data.

8. The system of claim 1, wherein the receiver at least comprises a Global Positioning System (GPS) data receiver for receiving GPS signals and determining location coordinates of the body.

9. The system of claim 8, further comprising a minimum variance estimator that derives range data based on the Global Positioning Satellite data.

10. The system of claim 1, wherein the positioning data is received from a Global Positioning System Satellite.

11. The system of claim 9, further comprising a minimum variance estimator that derives, range rate data based on the Global Positioning Satellite data.

12. The system of claim 9, wherein the minimum variance estimator is a Kalman filter.

13. The system of claim 11, wherein the minimum variance estimator is a Kalman filter.

14. The control system of claim 1, wherein the target has a predetermined position.

15. The system of claim 11, wherein the target has a pre-determined velocity.

16. The system of claim 11, wherein the body is an earth orbiting satellite.

17. A method for autonomous guidance of a body using a closed-loop feedback controller, comprising:

receiving position information of said body;

determining velocity of said body;

identifying a target position and a target velocity of a target;

determining position error and velocity error of the body relative to the target; and determining an action to be taken by the body to change the position and velocity errors of the body to predetermined values using said closed-loop feedback controller in real time.

18. The method for autonomous guidance of the body according to claim 17, wherein position information of the body is received from a Global Positioning Satellite.

19. The method for autonomous guidance of a body according to claim 17, wherein determining the action comprises determining thruster activation commands and/or parameters.

20. The method for autonomous guidance of a body according to claim 17, wherein determining the action comprises determining solar sailing commands and/or parameters.

21. The method for autonomous guidance of a body according to claim 17, wherein determining the action comprises propulsion activation commands and/or parameters.

22. The method for autonomous guidance of a body according to claim 17, wherein the target is a phantom.

23. The method for autonomous guidance of a body according to claim 17, wherein the target is a satellite.

24. The method for autonomous guidance of a body according to claim 17, wherein the body is a satellite.

25. The method for autonomous guidance of a body according to claim 17, wherein said body position follows an orbit.

26. The method for autonomous guidance of a body according to claim 17, wherein the body is a land vehicle.

27. The method for autonomous guidance of a body according to claim 17, wherein the target is a land vehicle.

28. The method for autonomous guidance of a body according to claim 17, further comprising the step of moving the body by executing the predetermined action.

29. The method for autonomous guidance of a body according to claim 28, wherein the predetermined values of the position and velocity errors are zero, the step of moving the body based on these predetermined zero values resulting in a rendezvous between the body and the target.

30. The method for autonomous guidance of a body according to claim 28, wherein the predetermined position error of the body is equal to zero and the predetermined velocity error of the body is not equal zero, the step of moving the body based on these predetermined values resulting in the body intercepting with the target.

31. The method for autonomous guidance of a body according to claim 28, wherein the predetermined position error of the body is not equal to zero and the predetermined velocity error of the body is equal to zero, the step of moving the body resulting in the body maintaining a predetermined distance from the target.

* * * * *

UNITED STATES PATENT AND TRADEMARK OFFICE
CERTIFICATE OF CORRECTION

PATENT NO. : 6,089,507
DATED : July 18, 2000
INVENTOR(S) : Parvez et al.

Page 1 of 9

It is certified that error appears in the above-identified patent and that said Letters Patent is hereby corrected as shown below:

Title page,
The title page should be deleted to appear as per attached title page.

Column 1,
Between lines 6 and 7, the following is inserted:

-- The U. S. Government has a paid-up license in this invention and the right in limited circumstances to require the patent owner to license others on reasonable terms provided for by the terms of contract number F29601-96-C-0124 awarded by the United States Air Force. --

Figs. 1-7 are deleted and replaced with the attached Figs. 1-7.

Signed and Sealed this

Fifth Day of February, 2002

Attest:

Attesting Officer

JAMES E. ROGAN
*Director of the United States Patent and Trademark Office*

United States Patent [19]
Parvez et al.

[11] Patent Number: 6,089,507
[45] Date of Patent: Jul. 18, 2000

[54] AUTONOMOUS ORBIT CONTROL WITH POSITION AND VELOCITY FEEDBACK USING MODERN CONTROL THEORY

[76] Inventors: Shabbir Ahmed Parvez, 2702 Copper Creek Rd., Herndon, Va. 20171; Guang-Qian Xing, 8515 Pelham Rd., Bethesda, Md. 20817

[21] Appl. No.: 09/319,161
[22] PCT Filed: Dec. 4, 1997
[86] PCT No.: PCT/US97/22612
  § 371 Date: Jun. 2, 1999
  § 102(e) Date: Jun. 2, 1999
[87] PCT Pub. No.: WO98/25156
  PCT Pub. Date: Jun. 11, 1998

Related U.S. Application Data

[60] Provisional application No. 60/032,613, Dec. 5, 1996.
[51] Int. Cl.$^7$ ..................................................... B64G 1/24
[52] U.S. Cl. ........................ 244/158 R; 244/164; 244/176
[58] Field of Search ............................ 244/158 R, 164, 244/176; 701/13

[56] References Cited

U.S. PATENT DOCUMENTS

| | | |
|---|---|---|
| 4,667,203 | 5/1987 | Counselman, III . |
| 5,109,346 | 4/1992 | Wertz . |
| 5,267,167 | 11/1993 | Glickman . |
| 5,374,011 | 12/1994 | Lazarus et al. |
| 5,528,502 | 6/1996 | Wertz . |

FOREIGN PATENT DOCUMENTS

| | | |
|---|---|---|
| 4243395 | 6/1993 | Germany |

OTHER PUBLICATIONS

Maute, P. et al., "Autonomous Geostationary Stationkeeping System Optimization and Validation", Acta Astronautica, vol. 20, pp. 93–101 (1989).

Eckstein, M.C. and Leibold, A., "Autonomous Station Keeping of Geostationary Satellites" Spacecraft Pointing and Control, Agard–AG–260, pp. 7/1–28 (Nov. 1981).

Eckstein, M.C., Leibold, A., and Hechler, F., "Optimal Autonomous Stationkeeping of Geostationary Satellites", American Astronautical Society and AIAA Astrodynamics Specialist Conference, Lake Tahoe, NV, AAS Paper No. 81–206 (Aug. 3–5, 1981).

Martinez, Juan J., "Optimal Orbit Control For Station Keeping With The Multisatellite Support System (MSSS)", Proc. AOCS Conference, Noordwijk, ESA–SP–128 (1977).

(List continued on next page.)

*Primary Examiner*—Galen L. Barefoot
*Attorney, Agent, or Firm*—Roylance, Abrams, Berdo & Goodman, L.L.P.

[57] ABSTRACT

An apparatus and method for orbit control and maintenance techniques for both individual satellites and for multiple satellites in a constellation utilizing Modern Feedback Control for providing precise autonomous on-board navigation and control. This control system can place any satellite in any orbit position in a constellation, including the acquisition of the initial distribution for the constellation after satellite separation from launched vehicles. This system can also maintain distribution within a constellation, including station relocation and station keeping. Utilizing GPS position information, the orbit state vector is determined and modern advanced multivariable feedback control techniques, for example, linear quadratic Gaussian/loop transfer recovery controllers or optimal H-Infinity Robust Controllers are used to design a navigation and control system. The present invention uses a feedback control system designed to attenuate the external perturbations and provide robustness against unstructured uncertainty. The control problem is converted into first a tracking problem and a regulator design problem where the control problem is to minimize both position error and velocity error between the satellite (pursuer) and a nonexistent target satellite in an ideal orbit. The elimination of position error and velocity error result in an optimal orbital control system.

31 Claims, 7 Drawing Sheets